United States Patent [19]

Burgess

[11] Patent Number: 4,872,281
[45] Date of Patent: Oct. 10, 1989

[54] DOWNRIGGER FISHING LINE HOLDER

[76] Inventor: Billie J. Burgess, P.O. Box 492, Grand Haven, Mich. 49417

[21] Appl. No.: 231,899

[22] Filed: Aug. 15, 1988

[51] Int. Cl.$^4$ ............................................. A01K 97/00
[52] U.S. Cl. .................................................. 43/43.12
[58] Field of Search .............................. 43/27.4, 43.12

[56] References Cited

U.S. PATENT DOCUMENTS

| | | | |
|---|---|---|---|
| 2,958,976 | 11/1960 | Adams | 43/43.12 |
| 2,959,884 | 11/1960 | Le May | 43/43.12 |
| 3,019,050 | 5/1963 | Metzler | 43/44.91 |
| 3,081,575 | 3/1963 | Meisner | 43/43.12 |
| 3,839,813 | 10/1974 | DeSmidt et al. | 43/43.12 |
| 3,874,110 | 4/1975 | Larson | 43/43.12 |
| 3,959,913 | 6/1976 | Weber | 43/43.12 |
| 4,173,091 | 11/1979 | Emory, Jr. | 43/43.12 |
| 4,205,478 | 6/1980 | Emory | 43/44.85 |
| 4,221,068 | 9/1980 | Roemer, Jr. | 43/43.12 |
| 4,395,841 | 8/1983 | Cudnohufsky | 43/43.12 |
| 4,417,414 | 11/1983 | Hood et al. | 43/43.12 |
| 4,513,524 | 4/1985 | Jolliff | 43/43.12 |

FOREIGN PATENT DOCUMENTS 716271  1/1965  Canada ............................. 43/44.88

Primary Examiner—Nicholas P. Godici
Assistant Examiner—William Scott Andes
Attorney, Agent, or Firm—Waters, Morse & Harrington

[57] ABSTRACT

This releasing line holder for a downrigger trolling system has an elongated body portion with a slot normally receiving a downrigger cable. A barrier secures the holder to the cable. A releasing line clamp carried by the body holds the line with a selected degree of resistance against lateral pull-out by a biting fish. Line-release is provided by mechanical or magnetic retention.

10 Claims, 2 Drawing Sheets

DOWNRIGGER FISHING LINE HOLDER

BACKGROUND OF THE INVENTION

A fishing technique known as "deep trolling" has evolved its own special equipment. A heavy weight, often streamlined, is lowered on a cable with a winch to a point below the level at which the fish are suspected of congregating. This point is often located by modified electronic depth-finding equipment. As the cable is unwound from the reel, lowering the weight, the fish line (with bait attached) is clipped to a release device on the cable. These devices are designed so that a pull corresponding to the bite of a fish will provide enough force to pull the fish line free of the clip, leaving the fish line to the exclusive control of the fishing rod that had been in storage position up to this point in a holder at the gunwale of the boat. The behavior of the fish line makes it obvious that the bait has been struck, and the fisherman then removes the rod from the holder and manipulates it in the usual manner.

A great variety of devices are available for attachment to the downrigger cable to provide the line-release feature. Some of these involve components that are attached to the fish line, and are pulled free of the release. device at a predetermined force. Anything permanently attached to the fish line is likely to interfere with the manipulation of the rod and reel. Another problem in the use of these devices has been the notorious difference in the ways various kinds of fish will attack a bait. Some of them are quite vicious about it; and it is desirable to have a fairly substantial pull-out force, so that the hook can be properly set. Others appear to be much more gentle, and the line must be freed in response to a much smaller force. The fisherman is usually fairly well aware of the type of fish he expects, and should be able to adjust the release device accordingly. When the device has been properly "adjusted", it should be attachable easily to the cable. This is particularly desirable when a series of devices are to be attached to the line to place baits at different levels. It must be kept in mind that the fish line is not fed through the release devices, but is engaged and released laterally.

SUMMARY OF THE INVENTION

This releasing line holder for a downrigger system has an elongated body portion with a side slot normally receiving the downrigger cable. A cable retainer secures the line holder to the cable, with freedom to slide along it. A clamping device releasably holds the fish line until a fish pulls it free. A magnetic form of the clamping device has a hinged flap of magnetic material holding the line against the pole pieces with a selected intensity of force, or in a vertical position in a line receiver until the receiver is pulled free toward a horizontal release position.

DESCRIPTION OF THE PREFERRED EMBODIMENT

Figure 1:
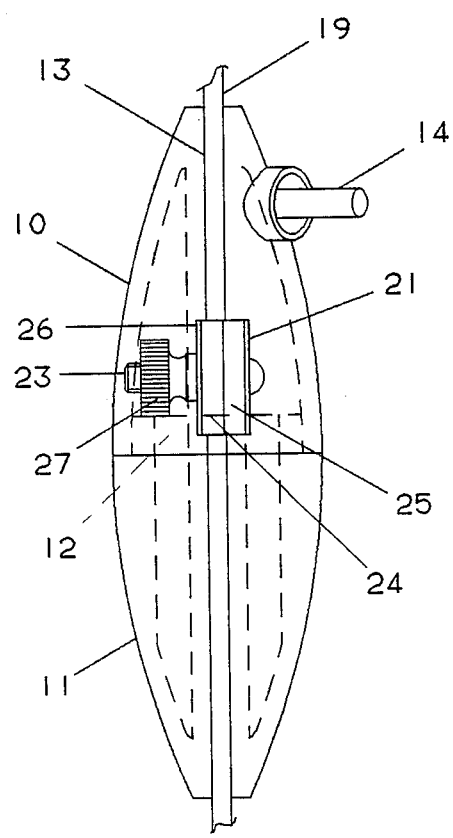
FIG. 1 is an elevation of the preferred form of the device.

Referring to FIGS. 1 through 4, an elongated body providing axial stability is formed by the upper and lower sections 10 and 11. These are generally circular in cross section, and are preferably hollow and formed of a molded plastic. The lower section 11 has a portion of reduced diameter indicated at 12 which is telescopically received within the upper section 10, primarily to maintain proper location of the two sections with respect to each other, and provide surfaces for receiving adhesive when the two sections are interengaged. Prior to the interengagement, the device may be ballasted, if desired, by placing sand or shot in the hollow space defined by the sections. These sections are aligned so that a slot 13 extends the full length of the body without interruption, the slot extending inward approximately to the central axis of the body. The slot 13 is at least wide enough to accept whatever standard cable diameter is to be used. The cable is retained in the slot with the spring-loaded plunger 14 shown best in FIG. 4. The plunger is biased inwardly by the compression spring 15 held in position by the retaining washer 16, pressed or otherwise secured in the counterbore 17 in the upper body section 10. The installation of the cable in the slot 13 is accomplished by withdrawing the plunger 14, which traverses the slot 13 under the action of the spring 15. The entrapment of the cable 19 behind the plunger 14 leaves the device free to slide along the cable. The position of the device along the cable is controlled by the length of the fishline that is let out from the rod and reel, extending to the release clamp. After the line has been pulled free by a fish, the release device slides down the cable to the weight, or to some other abutment on the cable. The release device can be retrieved by raising the cable, or another release device can be snapped onto the cable and lowered by the fish line to the desired depth.

Figure 2:
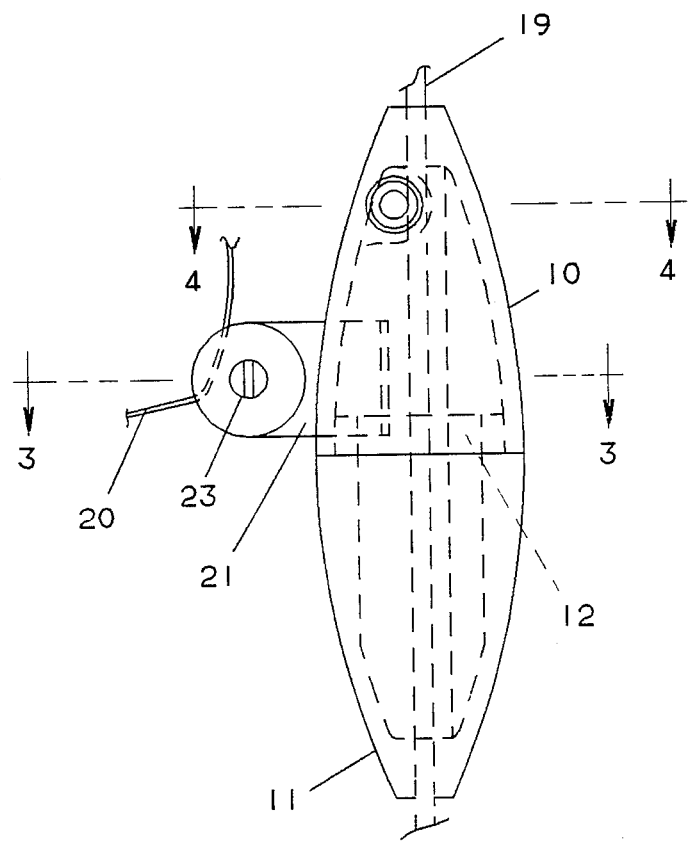
FIG. 2 is a side view with respect to FIG. 1.
Figure 3:
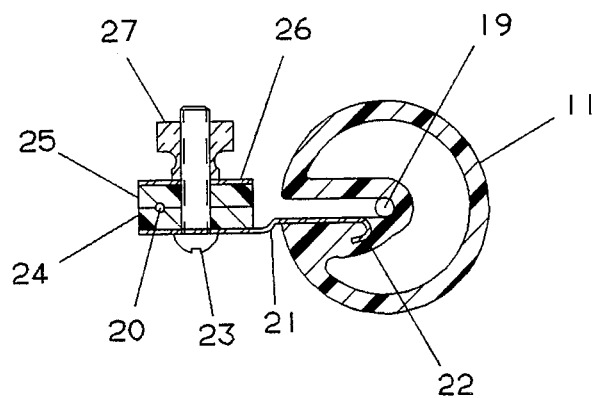
FIG. 3 is a section on the plane 3—3 of FIG. 2.
Figure 4:
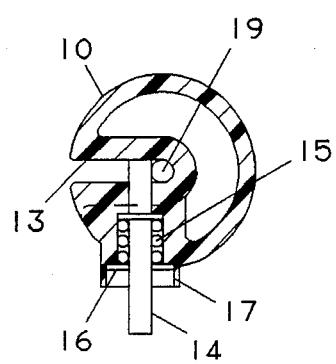
FIG. 4 is a section on the plane 4—4 of FIG. 2.

Two forms of clamping device are shown releasably holding the fish line 20. A mechanical arrangement is shown in FIGS. 2 and 3. A plate 21 is preferably molded integrally with the upper body section 10 as an insert in the molding die. An inner portion 22 is preferably offset to improve the retention of the plate in the plastic material. A screw 23 traverses the plate 21, and also the rubber washers 24 and 25 and the steel washer 26. The nut 27 provides an adjustable clamping action holding the two rubber washers gently together, so that the degree of retention of the fish line 20 against lateral pullout can be controlled.

Figure 5:
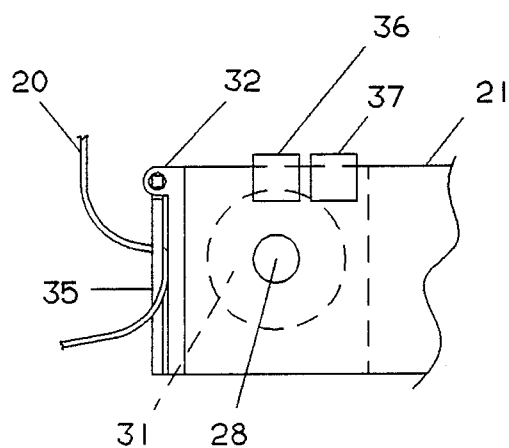
FIG. 5 is a side elevation of a modified form of the device involving a magnetic release.
Figure 7:
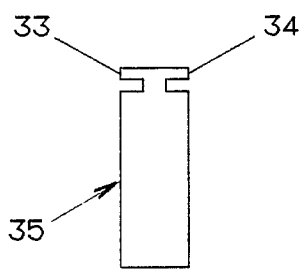
FIG. 7 is a plan view of the release flap of the mechanism shown in FIGS. 5 and 6.
Figure 6:
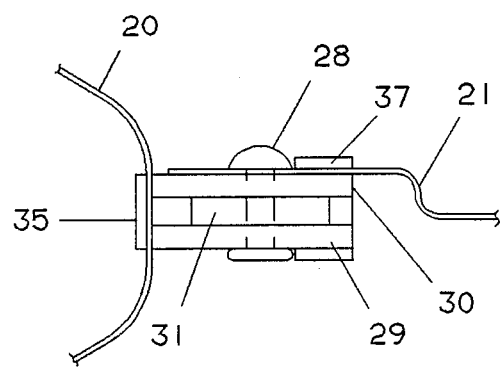
FIG. 6 is a bottom view with respect to FIG. 5.
Figure 8:
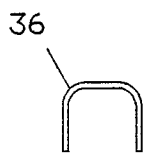
FIG. 8 is an end view of a magnetic shunt clip appearing in FIG. 5.

FIGS. 5 through 8 illustrate a modified form of the invention providing a magnetic release mechanism. Utilizing essentially the same plate 21, a rivet 28 traverses the pole plates 29 and 30 of magnetic material, and the permanent magnet 31. The pole plates have hinge extensions as shown at 32 in FIG. 5 receiving the projections 33 and 34 of the flap 35 of magnetic material shown in FIG. 7. The flap is thus free to swing from a position drawn against the edges of the pole plates by a magnetic force to an outward position approaching horizontal whenever the pull of a fish exceeds the magnetic attraction holding the flap against the fish line and trapped between the flap and the pole pieces. According to preference, the fish line may simply be run through underneath the flap 35, as shown in FIG. 5, or may be wrapped around the flap a couple of turns. The line is easily pulled free after the flap has swung outward. The intensity of the magnetic force holding the flap against the fish line can be controlled by the addition of the "U"-shaped shunt clips of magnetic material shown at 36 and 37. These are shown in detail in FIG. 8, and may be added to form shunt paths for the magnetic flux between the pole plates 29 and 30, with resulting decrease in the magnetic force holding the flap 35 against the fish line.

Figure 9:
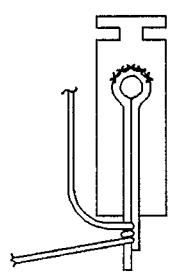
FIG. 9 is a plan view of a modified form of the invention with respect to the line release.

FIG. 9 shows a modified form of magnetic release. The line is held in the receiver 38, which is a cotter key tack-welded to the flap 39 at 40, and extending beyond it. Pulling the line through between the legs of the cotter pin, as shown, and wrapping it once around and back between the legs, gives a gentle grip on the fish line. When a fish pulls the flap (and its cotter pin) toward a horizontal position, the line is easily pulled out of the grasp of the cotter pin.

I claim:

1. A line holder for a downrigger fishing system, comprising:
   an elongated body having a slot along one side adapted to receive a downrigger cable;
   releasable means forming a barrier across said slot, said barrier being spring-loaded plunger normally traversing, and withdrawable from, said slot; and
   releasable clamping means on said body adjacent said slot, and operative to hold a fish line with a predetermined degree of resistance against pull-out.

2. A line holder for a downrigger fishing system, comprising:
   an elongated body having a slot along one side adapted to receive a downrigger cable;
   releasable means forming a barrier across said slot; and
   releasable clamping means on said body adjacent said slot, and operative to hold a fish line with a predetermined degree of resistance against pull-out, said clamping means including a plate secured to said body, and also including magnet means providing opposite pole surfaces at a normally substantially vertical side, and also including a hinged flap of magnetic material moveable to a position forming a bridge between said pole surfaces, and swingable toward a horizontal position to release a fish line entrapped between said flap and said pole surfaces.

3. A line holder as defined in claim 2, wherein said flap is adapted to clamp a fish line against said pole surfaces.

4. A line holder as defined in claim 2, additionally including removable bridge means of magnetic material providing a shunt path for magnetic flux.

5. A line holder as defined in claim 2, wherein said magnet means includes a permanent magnet and pole plates secured to the opposite ends thereof, and said flap is hinged to said pole plates.

6. A line holder as defined in claim 2, additionally including a line receiver secured to said flap, and having legs extending beyond said flap.

7. A line holder as defined in claim 6, wherein said legs are biased together.

8. A line holder for a downrigger fishing system, comprising:
   a body portion engageable with a downrigger cable; and
   releaseable line-clamping means mounted on said body portion and including magnet means providing opposite pole surfaces, and also including a hinged flap of magnetic material moveable to and from a position forming a bridge between said pole surfaces, and swingable toward a horizontal position to release a fish line.

9. A line holder as defined in claim 8, wherein said line is normally entrapped between said flap and pole surfaces.

10. A line holder as defined in claim 8, additionally including a line receiver secured to said flap, and having adjacent legs extending beyond said flap and biased together.

* * * * *